(12) United States Patent
Khaishgi et al.

(10) Patent No.: US 7,092,912 B2
(45) Date of Patent: *Aug. 15, 2006

(54) SECURITY FOR UNIQUELY GENERATED ELECTRONIC SEALS OF CERTIFICATION

(75) Inventors: Ahmed Khaishgi, San Francisco, CA (US); John Quinn, San Francisco, CA (US)

(73) Assignee: SquareTrade, Inc., San Francisco, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/643,309

(22) Filed: Aug. 19, 2003

(65) Prior Publication Data

US 2004/0034606 A1  Feb. 19, 2004

Related U.S. Application Data

(63) Continuation of application No. 09/634,149, filed on Aug. 8, 2000, now Pat. No. 6,658,394.

(51) Int. Cl.
*G06Q 9/00* (2006.01)

(52) U.S. Cl. .......................................... 705/58; 705/62

(58) Field of Classification Search ............ 705/53–55, 705/58, 62; 345/2.1–2.2, 628; 101/31.1; 235/29 A
See application file for complete search history.

(56) References Cited

U.S. PATENT DOCUMENTS

| | | | |
|---|---|---|---|
| 5,495,412 A | 2/1996 | Thiessen | |
| 5,538,290 A * | 7/1996 | Diamond | .................... 283/113 |
| 5,668,953 A | 9/1997 | Sloo | |
| 5,884,944 A * | 3/1999 | Durham | ....................... 283/67 |
| 5,893,117 A | 4/1999 | Wang | |
| 5,893,905 A | 4/1999 | Main et al. | |
| 5,895,450 A | 4/1999 | Sloo | |
| 5,956,687 A | 9/1999 | Wamsley et al. | |
| 5,970,475 A | 10/1999 | Barnes et al. | |
| 6,237,096 B1 | 5/2001 | Bisbee et al. | |
| 6,330,551 B1 | 12/2001 | Burchetta et al. | |
| 6,347,332 B1 | 2/2002 | Malet et al. | |
| 6,363,384 B1 | 3/2002 | Cookmeyer, II et al. | |
| 6,389,151 B1 | 5/2002 | Carr et al. | |
| 6,442,687 B1 | 8/2002 | Savage | |
| 6,470,448 B1 * | 10/2002 | Kuroda et al. | .............. 713/176 |
| 6,766,307 B1 | 7/2004 | Israel et al. | |

(Continued)

FOREIGN PATENT DOCUMENTS

EP    0 689 824 A1    1/1996

(Continued)

OTHER PUBLICATIONS

Liddy, Carrie, "Commercial Security on the Internet", Internet Research v6n2/3, 1996, pp. 75-78, ISSN: 1066-2243.*

(Continued)

*Primary Examiner*—Mary D. Cheung
(74) *Attorney, Agent, or Firm*—Shumaker & Sieffert, P.A.

(57) ABSTRACT

The invention provides techniques for issuing electronic seals of certification to online entities, such as online merchants, in a manner that prevents non-certified parties from easily stealing or otherwise misusing the seals. A central seal issuer verifies the credentials, policies or business practices of each merchant and issues a corresponding seal of certification. For each merchant, the seal issuer generates a unique media object representing an electronic seal. The media object includes an encrypted watermark containing an expiration date. The media objects are stored on a seal server such that the merchants can dynamically retrieve and display the electronic seals when accessed by a user. The seal issuer can easily revoke or update the centrally stored seals.

30 Claims, 4 Drawing Sheets

U.S. PATENT DOCUMENTS

| | | | |
|---|---|---|---|
| 2001/0007106 | A1 | 7/2001 | Slaikeu |
| 2002/0007362 | A1 | 1/2002 | Collins et al. |
| 2002/0038293 | A1 | 3/2002 | Seiden |
| 2003/0028762 | A1 | 2/2003 | Trilli et al. |
| 2003/0188194 | A1 | 10/2003 | Currie et al. |
| 2004/0210527 | A1 | 10/2004 | Woda et al. |
| 2005/0044009 | A1 | 2/2005 | Stone et al. |

FOREIGN PATENT DOCUMENTS

| | | | |
|---|---|---|---|
| JP | 02284261 A | * | 11/1990 |
| JP | 2003-114927 | | 10/2001 |

OTHER PUBLICATIONS

Bordone, Robert C., "175 Electronic Online Dispute Resolution: A Systems Approach-Potential, Problems, and a Proposal," Harvard Negotiation Law Review, pp. 175-211, 1998, http://cyber.law.harvard.edu/property00/jurisdiction/bordoneedit.html.

Chua, Lusan, "Ebay: Conflict Management in an Online Community," 2002, http://www.ombuds.org/cyberweek2003/chua.paper.htm.

Devack, Melissa, "Intellectual Property As An Investment: A Look At How ADR Relates to the European Union's Proposal for Electronic Commerce in the Single Market," 2002, http://www.cardozo.yu.edu/cojcr/final_site/articles_notes/vol2_an/Devack.htm.

Geist, Michael, "Fair.com?: An Examination of the Allegations of Systemic Unfairness in the ICANN UDRP," University of Ottawa, Aug. 2001, http://aix1.uottawa.ca/~geist/geistudrp.pdf.

Gilbert, Pamela, "On Space, Sex and Stalkers," http://www.echonyc.com/~women/Issue17/art-gilbert.html.

Johnson, David R., "Dispute Resolution in Cyberspace," http://www.eff.org/Legal/Arbitration/online_dispute_resolution_johnson.article, Feb. 1994.

Katsh, Ethan M., "Dispute Resolution in Cyberspace," Conn. L. Rev., 1996, http://www.umass.edu/legal/articles/uconn.html.

Katsh, Ethan et al., E-Commerce, E-Disputes, and E-Disputes Resolution: In the Shadow of "eBay Law", Ohio State Journal on Dispute Resolution, vol. 15:3, pp. 705-734, 2000.

Manevy, Isabelle, "Online Dispute Resolution: what future?" Jun. 2001, http://www.ombuds.org/cyberweek2002/manevy_odr01.pdf.

Mudd Jr., Charles Lee, "Cybercourt: A Virtual Resolution of Differences," 1995, http://www.mudd.org/professional/articlesclm/cybercourt.htm.

Rabinovich-Einy, Orna, "The Ford-Firestones of the Future: Resolving Offline Disputes in an Online Society," http://www.ombuds.org/cyberweek2003/rabinovich_einy.htm.

Schneider, Michael E. et al., "Dispute Resolution in International Electronic Commerce," http://www.disputes.net/cyberweek2001/interElecCommerce.htm.

SchWeber, Claudine, "The Use of Technology in Conflict Resolution," 1995, http://www.batnet.com/oikoumene/arbtadr.html.

Thiessen, Ernest et al., "Beyond Win—Win in Cyberspace," Ohio State J. of Dispute Resolution, 2000, 15(3), 643, http://www.smartsettle.com/more/beyond/BeyondWinWin.html.

"ADR Resources," Center for Information Technology and Dispute Resolution, http://www.ombuds.org/center/articles1.

"Code of Online Business Practices," Council of Better Business Bureau, Inc., 2003, http://www.bbbonline.org/reliability/code/code.asp.

"Disputes in cyberspace 2001," Update for Online Disputes Resolution for Consumers in Cross-Border Disputes, Office for Developed and Transition Economics, Consumers International, Nov. 2001.

"Out-of-Court Dispute Settlement Systems for E-Commerce," The Report form the workshop held in Brussels, European Commission Report.

"Proceedings of a Conference on Electronic Dispute Resolution," National Center for Automated Information Research (NCAIR), May 22, 1996, Washington D.C.

Declaration of Ethan Katsh Under 37 C.F.R. 1.132.

Explanation of 'contact' and 'marketplace' printed from http://www.dictionary.com.

Information on Bell Atlantic, 1998, 1999.

Information on Neural Tech, Inc., 1996-1998.

Unisys to market Neural Tech CADRE software as part of its credit card dispute processing solution set, Oct. 22, 1998.

U.S. Appl. No. 09/504,159, filed Feb. 15, 2000, entitled "Electronic Dispute Resolution System," by Khaishgi, Ahmed et al.

U.S. Appl. No. 10/634,654, filed Aug. 5, 2003, entitled "System and Method for Resolving a Dispute in Electronic Commerce and Managing an Online Dispute Resolution Process," by Khaishgi, Ahmed et al.

U.S. Appl. No. 10/672,136, filed Sep. 26, 2003, entitled "Automated Online Dispute Resolution," by Khaishgi, Ahmed et al.

http://www.arb-forum.com—National Arbitration Forum.
http://www.i-courthouse.com—I-Courthouse, Inc.
http://wwwinternetneutral.com—Internet Neutral.
http://www.arbiter.wipo.int/arbitration/—WIPO Arbitration and Mediation Center.
http://www.clicknsettle.com—clickNsettle.com, Inc.
http://www.cybersettle.com—Cybersettle.com.
http://www.onlineresolution.com—OnlineResolution—Mediation.
http://www.iescrow.com—I-Escrow Inc.
http://www.resolution.org—Resolution Forum, Inc.
http://www.disputes.org—Disputes.Org.
http://www.ebay.com—eBay Inc.
http://www.digimarc.com—Digimarc.
http://www.webassured.com—WebAssured.com.
http://www.bbbonline.com—BBBonline (A Better Business Bureau Program).
http://www.valuestar.com—ValuStar, Inc.
http://www.verisign.com—VeriSign Internet Trust Services.
http://www.truste.com—TRUSTe.
http://www.paypal.com—PayPal.
http://www.betterweb.com—BetterWeb Program.

Nyhart, "Computer Modeling in Dispute Resolution: An Overview," *Dispute Resolution Forum*, Apr. 1988, p. 3, 11-15.

Elangovan, "Managerial third-party dispute intervention: A prescriptive model of strategy selection," *Academy of Management Review*, vol. 20, No. 4, pp. 800-830 (Oct. 1995).

www.shopping.com, 2 pages (last printed Apr. 5, 2005).
www.epinions.com, 2 pages (last printed Apr. 5, 2005).
www.bizrate.com, 2 pages (last printed Apr. 5, 2005).
www.nextag.com, 1 page (last printed Apr. 5, 2005).
www.pricegrabber.com, 2 pages (last printed Apr. 5, 2005).
www.cnet.com, 4 pages (last printed Apr. 5, 2005).
www.buysafe.com, 1 page (last printed Apr. 5, 2005).
www.geotrust.com, 1 page (last printed Apr. 5, 2005).
www.scanalert.com, 1 page (last printed Apr. 5, 2005).
www.hackersafe.com, 1 page (last printed Apr. 5, 2005).
www.comodogroup.com, 2 pages (last printed Apr. 5, 2005).
www.nabp.net, Verified Internet Pharmacy Practice Sites (VIPPS™), A Program of the *National Association of Boards of Pharmacy*, 2 pages (last printed Apr. 5, 2005).
www.webtrust.org/abtseals.htm, 9 pages (last printed Apr. 5, 2005).
www.epubliceye.com, 1 page (last printed Apr. 5, 2005).
www.gomez.com, 1 page (last printed Apr. 5, 2005).
www.visa.com, 1 page (last printed Apr. 5, 2005).
www.guardianecommerce.net, 2 pages (last printed Apr. 5, 2005).

International Search Report from corresponding PCT Application Serial No. PCT/US04/14726, mailed Jun. 1, 2005 (3 pages).

Written Opinion from corresponding PCT Application Serial No. PCT/US04/14726, mailed Jun. 1, 2005 (3 pages).

Non-Profit Dating Service retrieved from the Internet Archive Wayback Machine of data Feb. 19, 1999, (4 pages).

www.truste.com retrieved from the Internet Archive Wayback Machine, (63 pages).

* cited by examiner

SECURITY FOR UNIQUELY GENERATED ELECTRONIC SEALS OF CERTIFICATION

This application is a continuation patent application and claims priority from U.S. patent application Ser. No. 09/634,149, filed Aug. 8, 2000 now U.S. Pat. No. 6,658,394, the entire content of which is incorporated herein by reference.

TECHNICAL FIELD

The present invention relates to electronic seals.

BACKGROUND

One of the difficulties a user faces when engaging other parties online, such as joining online clubs, purchasing items or generally interacting with others, is that the user typically has limited contact with the other parties and, therefore, often has privacy concerns and other legitimate apprehensions. This is especially true when the user wishes to conduct business online, such as in an online marketplace or business-to-business intermediary. As a result, some organizations have established "seal programs" by setting policies and issuing electronic "seals" to companies that adhere to the policies. For example, TRUSTe™ is an independent, non-profit privacy organization that has developed a third-party oversight seal program that tries to alleviates users' concerns about online privacy, TRUSTe issues an electronic seal image to organizations that meet its privacy program. The certified organizations display the seal on their websites to indicate their compliance with the program.

SUMMARY OF THE INVENTION

In general, the invention provides techniques for issuing electronic seals such that non-certified parties cannot easily steal or otherwise misuse the seals. According to one aspect of the invention, a central seal "issuer" verifies the credentials, policies or business practices of online merchants and issues a corresponding seal of certification upon verification. Unlike conventional systems, the seal issuer can generate a unique seal for each merchant. The seal issuer generates the seal in the form of a media object that includes an encrypted watermark containing an expiration date. A central seal server stores the media objects such that the merchants can dynamically retrieve and display the electronic seals as needed. The seal issuer, therefore, can easily revoke or update the seals on the central seal server.

In another aspect, the invention is directed to a method in which a database is accessed to retrieve certification data for a set of online merchants and a corresponding media object is generated for each merchant as a function of the certification data. Each media object represents a seal of certification for the corresponding online merchant. In one configuration, the media objects are generated by an embedding an encrypted digital watermark having an expiration date for the seal. The media objects are stored on a seal server such that each media object can be retrieved according to a unique identifier for the corresponding merchant. Upon receiving such a request, the requested media object is communicated to a client device for presentment to a user.

In yet another aspect, the invention is directed to a computer-readable medium having instructions configured to cause a programmable-processor to perform the methods described herein.

The invention offers several advantages over conventional systems. For example, because the media objects are centrally stored by the seal issuer, and can be unique to each online merchant, each seal can easily be revoked or updated. Furthermore, requests to display the seals can more easily be tracked such that general usage can be reported and misuse can be detected.

Various embodiments of the invention are set forth in the accompanying drawings and the description below. Other features and advantages of the invention will become apparent from the description, the drawings, and the claims.

DETAILED DESCRIPTION

Figure 1:
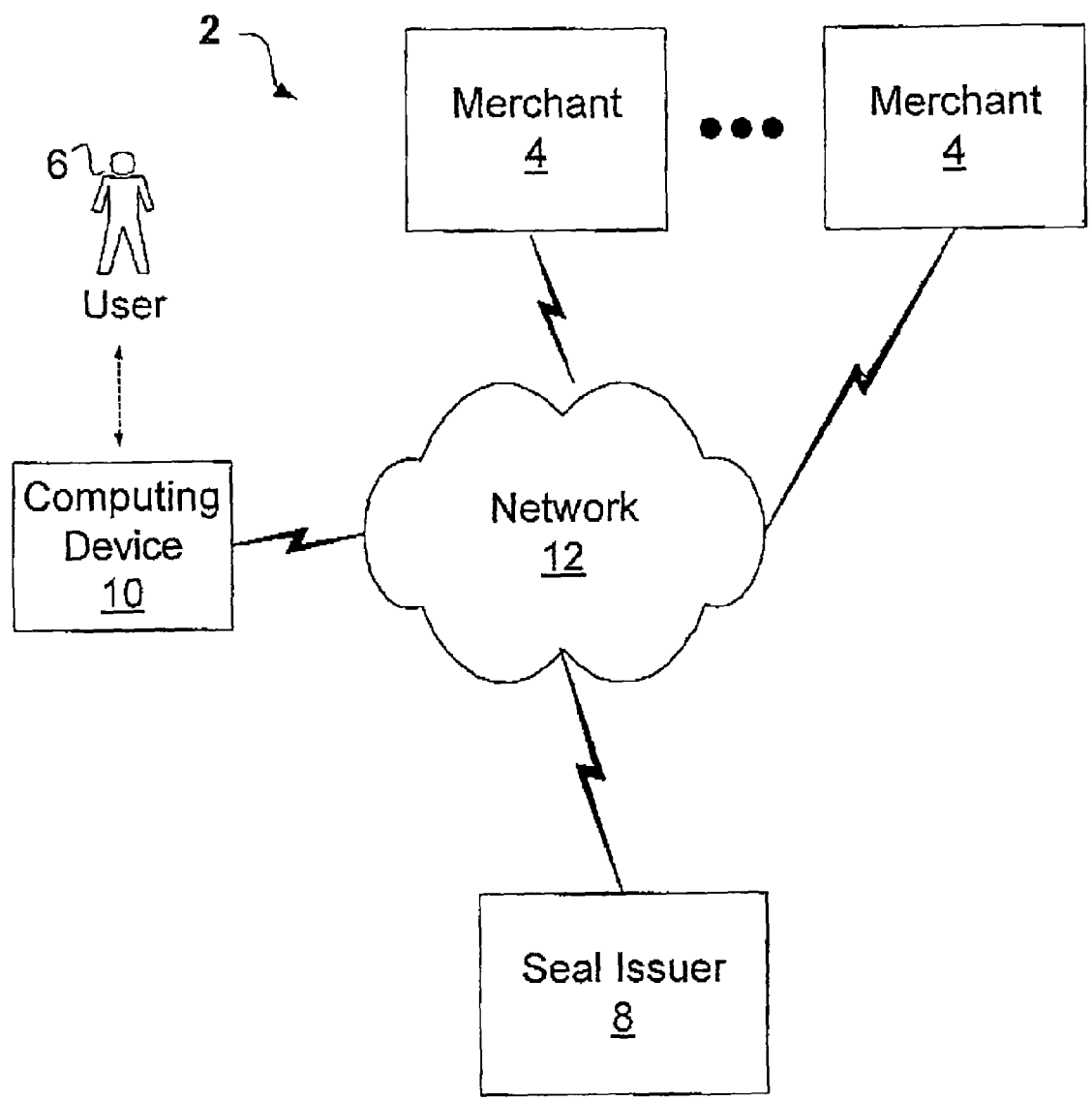
FIG. 1 is a high-level block diagram of an example system configured according the invention.

FIG. 1 is a high-level block diagram of a system 2 in which online merchants 4 provide goods and services to user 6. Merchants 4 represent business entities that transact goods or services over network 12, which represents a network of computing resources such as the Internet. For example, a merchant 4 can be a buyer or seller of goods, such as books, movies, software, computers, semiconductor components and the like. A merchant 4 can also be an entity that provides services over network 12, such as an online storage provider, an Application Service Provider (ASP) or even an online marketplace or other intermediary. Although described in the context of a business entity, merchants 4 can also be any entity having an online presence.

User 6 uses computing device 10 to remotely interact with merchants 4 over network 12. Computing device 10 represents any communication device suitable for interfacing with network 12 and interacting with merchants 4 such as a personal computer running a web browser such as Internet Explorer™ from Microsoft Corporation of Redmond, Wash. Alternatively, computing device 4 can be, for example, a personal digital assistant (PDA), such as a Palm™ organizer from Palm Inc. of Santa Clara, Calif., or a network-enabled cellular telephone.

Seal issuer 8 verifies the credentials, policies or business practices of each Merchant 4 and issues a corresponding seal of certification to each merchant 4 upon verification. In order to become a "seal holder", each merchant 4 must comply with requirements set by seal issuer 8. For example, seal issuer might, for example, verify that merchant 4 is a legitimate business merchant that complies with, or agrees to conform to, certain standards. For example, seal issuer 8 may be an online dispute resolution service that is designed to help buyers and sellers settle issues involving online transactions, such as issues that may arise in an online auction. In this instance, seal issuer 8 issues an electronic seal to merchants 4 that agree to participate in the web-based problem solving service. As another example, seal issuer 8 can be an organization that verifies merchants 4 compliance with privacy or security requirements. Alternatively, for example, seal issuer 8 may perform a nominal amount of certification before issuing the seal such as verifying the contact information.

Upon verifying a merchant 4, seal issuer 8 issues the merchant 4 an electronic seal that is a recognizable symbol associated with certain qualities such as trustworthiness, reliability, and superior customer service. Merchants 4 post their corresponding electronic seals on their web sites or in electronic mail messages (emails) in order to increase the confidence of potential customers. Unlike conventional techniques, seal issuer 8 does not issue a static image to merchants 4. As described in detail below, seal issuer 8 generates and maintains a unique electronic seal for each merchant 4. As such, seal issuer 8 can instantly issue, update, change, or revoke a seal when a merchant 4 fails to comply with the requirements. In addition, seal issuer 8 tracks the use of all issued electronic seals in order to detect any misuse or theft of the seal.

Figure 2:
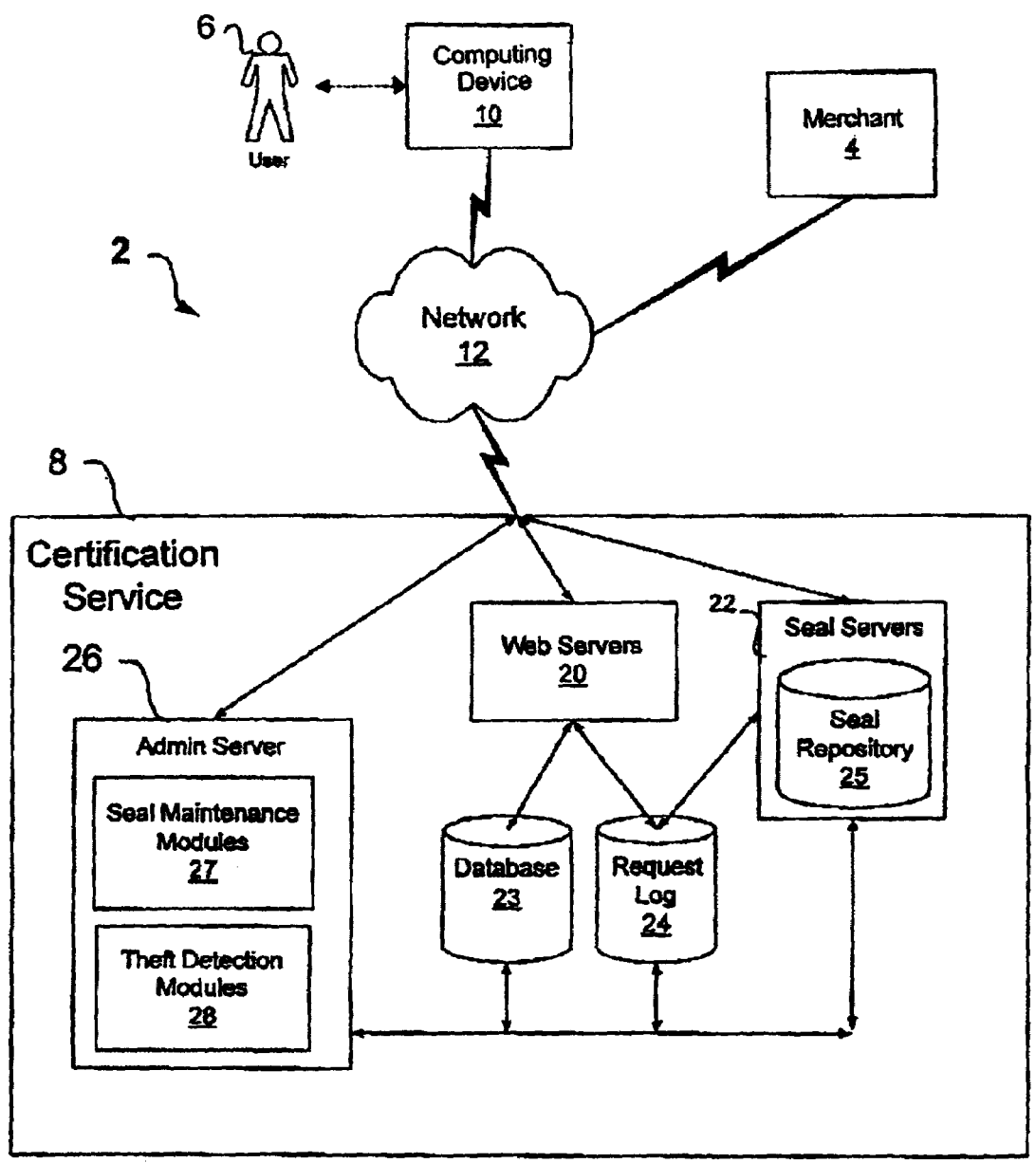
FIG. 2 is a more detailed block diagram of an example system configured according to the invention.

FIG. 2 is a block diagram illustrating one example of seal issuer 8. Seal issuer 8 includes web servers 20, seal servers 22, administration ("admin") server 26, database 23, request log 24 and seal repository 25.

Web servers 20 provide an interface for communicating with computing device 10 via network 12. Web servers 20 execute web server software, such as Internet Information Server™ from Microsoft Corporation, of Redmond, Wash., and provide an environment for interacting with users 6 and merchants 4, such as when merchants 4 apply for seals or when users 6 request more information about a certified merchant 4. Web servers 20 serve web pages and communicate the web pages over network 12. The web pages may include static media such as text and graphic imagery, as well as conventional input media such as text entry boxes, radio buttons, drop-down menus, and the like.

Seal servers 22 provide access to seal repository 25, which stores a set of media objects that represent the electronic seals. Each media object contains media, such as image data, video data, and audio data, that merchant 4 presents as an electronic seal of certification. Each media object corresponds to one of the merchants 4 and can be retrieved from seal repository 25 based on a unique identifier for the corresponding merchant. In one configuration, each media object is given a unique file name and stored within a file system provided by seal server 22 such that computing device 10 can directly retrieve the media object without requiring that seal issuer 8 access a database. In addition to the media, such as the image data, each media object contains a watermark having encrypted information such as an expiration date, a time stamp and the unique identifier for the corresponding merchant 4.

Database 23 stores information for each merchant 4 such as current certification status, contact information and an expiration date for each merchant's unique seal. Request log 24 stores all requests for the media objects and the merchant information.

Admin server 26 provides administrative functionality for seal issuer 8 and provides an operating environment for a number of software modules including seal maintenance modules 27 and theft detection modules 28. Seal maintenance modules 27 are responsible for generating a unique media object when a new merchant 4 is certified and updating the media object if the merchant loses its certified status. In addition, seal maintenance modules 27 periodically regenerate the media objects, including updating the embedded expiration date and the timestamp.

Upon certifying a merchant 4, seal maintenance modules 27 generate a corresponding media object and issue code for use by the merchant to uniquely reference the media object. For example, a merchant 4 having a unique identifier of 1520511267 can use the following code to reference a media object housed within seal servers 22:

<a HREF="http://sealissuer.com/1520511267.map" TARGET="_blank"><IMG ISMAP SRC="http://sealissuer.com/1520511267.gif" ALT="Click to verify" BORDER=0></a>

The above code uses server-side image maps such that when user 6 clicks on any area of the presented image, the pixel coordinate information is transmitted to seal issuer 8 where it is remotely translated into an appropriate action. This advantageously removes any client-side scripting dependencies and greatly reduces the size of the client-side code required to display the seal.

Theft detection modules 28 analyze request log 24 in order to detect any misuse or theft of an electronic seal. For example, when a seal is requested, seal servers 22 record the internet protocol (IP) address of the requesting merchant within request log 24. In addition, when user 6 clicks on the seal to verify the seal, web servers 20, provide the information to the user and log the IP address of computing device 10. Theft detection modules 28 analyze request log 24 to detect any new or unexpected IP addresses. Upon detecting misuse, seal maintenance modules 27 issue a new seal to the affected merchant 4 by generating a new media object, storing the media object within seal repository 25, and instructing the merchant to update its website software to point to the new seal.

Theft detection modules 28 also use spidering technology to search network 12 for all occurrences of issued seals. Upon finding a seal, theft detection modules 28 decrypt the embedded watermark, determine whether the seal has expired, inform any interested parties of the expiration and optionally revoke the expired seal.

Figure 3:
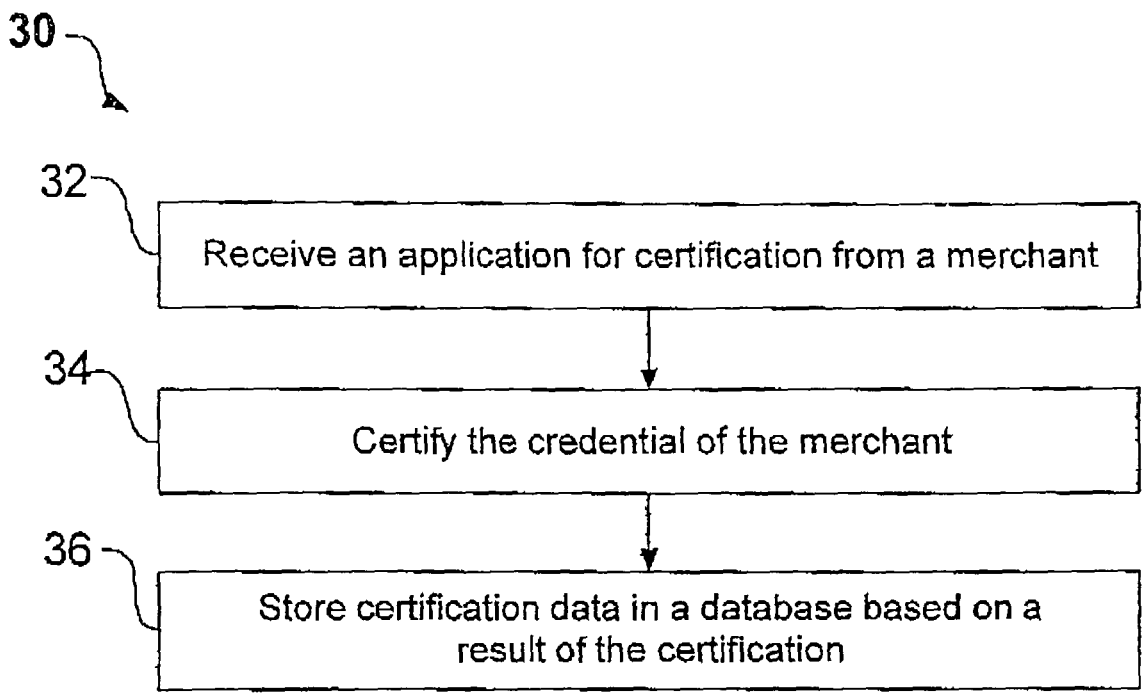
FIG. 3 is a flowchart illustrating an example process in which the system certifies online merchants.

FIG. 3 is a flowchart illustrating an example process 30 in which seal issuer 8 certifies an online merchant 4. First, seal issuer 8 receives an application from merchant 4 including contact information, business organization and location. This request may be received electronically via network 12 or through conventional communication mechanisms such as the postal service (step 32). Seal issuer 8 researches merchant 4, verifies that the merchant is a legitimate business organization and certifies that the merchant's business practices meet all standards necessary to obtain the seal (step 34). Upon certifying merchant 4, seal issuer 8 stores the certification data in database 23 (step 36).

Figure 4:
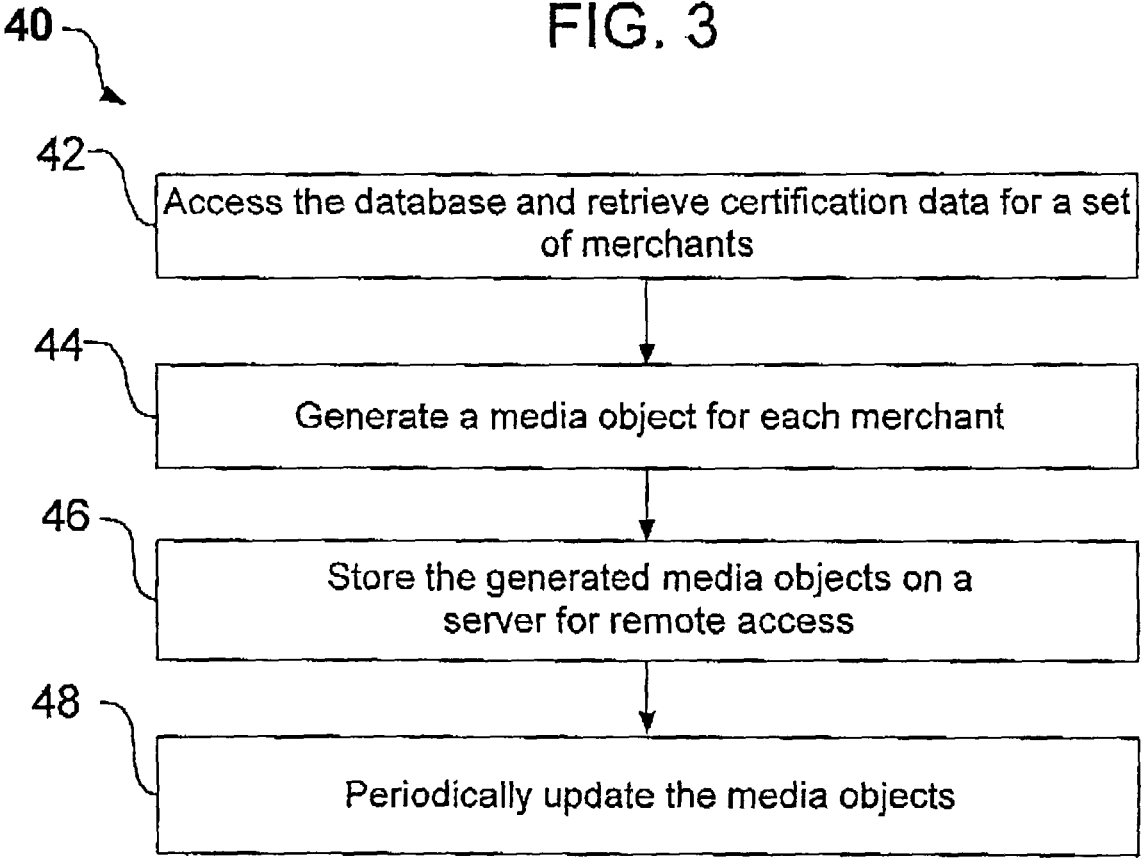
FIG. 4 is a flowchart illustrating an example process in which the system generates and maintains a set of media objects that represent electronic seals of certification.

FIG. 4 is a flowchart illustrating an example process 40 in which seal issuer 8 generates and maintains the media objects within seal repository 25. Upon verifying one or more merchants 4, seal maintenance modules 27 access database 23 and retrieve the certification data for each certified merchant 4. Next, based on this information, seal maintenance modules 27 generate a unique media object for each merchant 4 (step 44) and store the media objects within seal servers 22 (step 46) such that computing device 10 can remotely access the media objects. Next, seal maintenance modules 27 periodically regenerate the media objects in order to update the embedded information including the expiration date (step 48). For example, a new set of media objects can be generated daily in order to facilitate detection of expired seals. In one configuration, seal issuer 8 generates a media object having a transparent image when the corresponding merchant 4 loses its certification status. In this manner, the seal "disappears" from the merchant web site.

Figure 5:
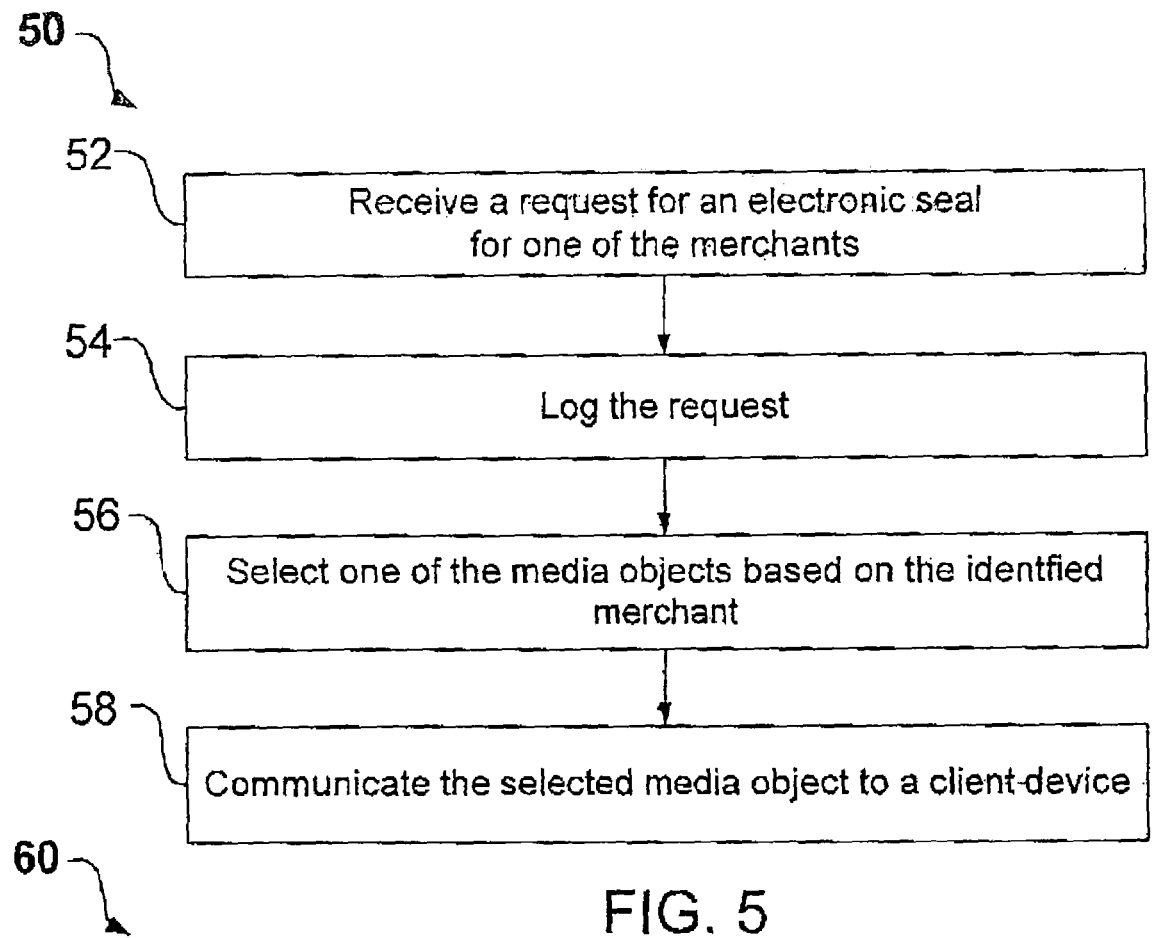
FIG. 5 is a flowchart illustrating an example process in which the system services requests from the online merchants to present the electronic seals.

FIG. 5 is a flowchart illustrating an example process 50 in which seal issuer 8 services requests from the online merchants 4 to present the electronic seals to user 6. When user 6 accesses a merchant 4, client device 10 is directed to retrieve a seal from seal servers 22. More specifically, seal servers 22 receive a request from computing device 10 that includes a unique identifier for one of the merchants and, therefore, uniquely identifies one of the media objects within seal repository 25 (step 52). Seal servers 22 log the request by storing the IP address within request log 24 (step 54) and select the appropriate media object according to the unique identifier (step 56). For example, seal servers 22 may simply identify an appropriate file that stores the media object based on the unique identifier. Upon selecting the media object, seal servers 22 communicate the media object to computing device 10, which in turn presents the media to user 6 (step 58).

Figure 6:
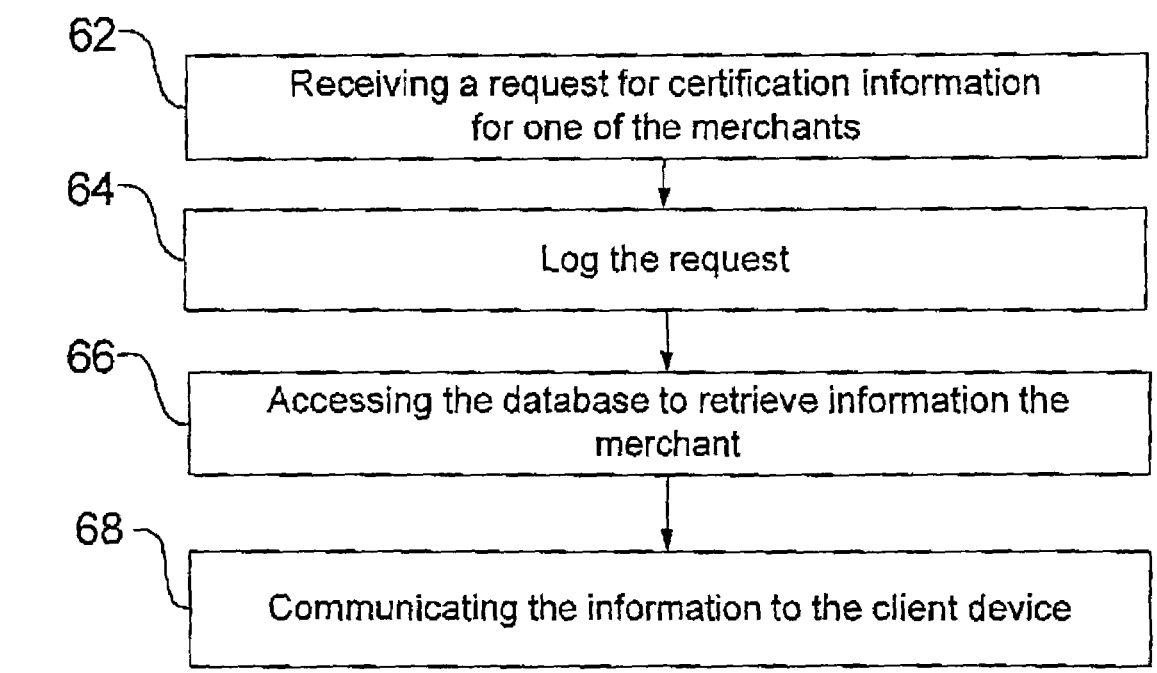
FIG. 6 is a flowchart illustrating an example process in which the system services requests from users to view certification information for the online merchants.

FIG. 6 is a flowchart illustrating an example process 60 in which the seal issuer 8 services user requests to verify a seal by viewing certification information for the online merchants 4. After the media is presented to user 6, as described above, the user 6 has the option to click on the displayed media to view the certification information for the merchant 4. For example, when the user clicks an image, web servers 20 receive pixel information describing where the user clicked on the image as well as a unique identifier for the merchant (step 62). Upon receiving the request, web servers 20 log the request (step 64) and access database 23 to retrieve information relating to the identified merchant (step 66). Web servers 20 assemble the retrieved data into a web page and serve the web page to client device 10 for display to user 6 (step 68). Alternatively, web servers 20 direct computer device 10 to a static web page for the corresponding merchant 4.

In one configuration, web servers 20 filters the information based on one or more stored settings, such as an anonymity parameter, which causes web servers 20 to filter contact information for the merchant 4. In another configuration, web servers 20 monitor the requesting universal resource locator (URL) for merchant 4 and filter the information accordingly. In this manner, seal issuer 4 can filter contact information when the seal is used by online intermediaries that prevent buyers from directly contacting sellers.

Various embodiments have been described for issuing electronic seals of certification to online entities, such as online merchants. These and other embodiments are within the scope of the following claims.

What is claimed is:

1. A method for preventing misuse of electronic seals associated with participants in an online marketplace that is accessed via a computer network and enables participants to buy and sell items, the method comprising:
generating corresponding media objects for each of a plurality of participants in the marketplace, wherein each of the media objects includes media to present a seal of certification for each of the participants as an image;
embedding dates into the media objects;
accessing a network of computing resources to identify occurrences of the media objects, wherein the media objects are presented as portions of websites associated with the online marketplace;
reading the dates embedded within the media objects to determine whether the media objects are valid; and
revoking each media object that is determined not to be valid.

2. The method of claim 1, further comprising certifying the participants,
wherein generating corresponding media objects comprises selectively generating corresponding media objects based on the seal of certification.

3. The method of claim 1, wherein embedding dates into the media objects includes embedding expiration dates for the seals into the media objects.

4. The method of claim 3, wherein embedding expiration dates includes encrypting the expiration dates.

5. The method of claim 1, wherein revoking the media objects includes replacing a media object located on a remote server with a second media object.

6. The method of claim 5, wherein the second media object contains an image visually different from an image contained within the replaced media object.

7. The method of claim 1, further comprising:
receiving requests from web browsers executing on client devices for the media objects;
communicating the requested media objects to the requesting web browsers for presentment of the respective seals of certification to users as portions of websites; and
maintaining a log of the requests to detect misuse of the media objects.

8. The method of claim 7, wherein maintaining a log of the requests comprises storing a unique identifier for each client device within the request log.

9. The method of claim 8, wherein the unique identifier include an Internet Protocol address.

10. The method of claim 7, further comprising:
analyzing the request log to detect misuse of the media objects; and
alerting the entities associated with misused media objects of the detected misuse.

11. The method of claim 10, wherein analyzing the request log to detect misuse comprises analyzing the request log to detect an unexpected unique identifier.

12. The method of claim 1, further comprising certifying the participants,
wherein generating corresponding media objects comprises generating corresponding media objects for each of the participants based on the seal of certification.

13. The method of claim 12, wherein certifying the participants comprises at least one of verifying that a business practice of the participants meets a standard or receiving agreements to participate in online dispute resolution from the participants.

14. The method of claim 1, wherein the participants are sellers in the online marketplace.

15. A method for preventing misuse of electronic seals associated with participants in an online marketplace that is accessed via a computer network and enables participants to buy and sell items comprising, the method comprising:
generating corresponding media objects for each of a plurality of participants in the online marketplace, wherein each of the media objects includes media to present a seal of certification for each of the participants as an image;
receiving requests from web browsers executing on client devices for the media objects;
communicating the requested media objects to the requesting web browsers for presentment of the respective seal of certification to users as portions of websites associated with the online marketplace;

maintaining a log of the requests that includes an Internet Protocol address associated with each of the requesting client devices;

analyzing the request log to detect misuse of the media objects;

alerting the participants associated with misused media objects of the detected misuse;

removing the misused media objects from a server; and generating new media objects for the participants associated with the misused media objects.

16. The method of claim 15, further comprising certifying the participants, wherein generating corresponding media objects comprises generating corresponding media objects for each of the participants based on the seal of certification.

17. The method of claim 16, wherein certifying the participants comprises at least one of verifying that a business practice of the participants meets a standard, verifying that the participants agree to the standard, or receiving agreements to participate in online dispute resolution from the participants.

18. The method of claim 15, wherein the participants are sellers in an online marketplace.

19. A method for selectively providing information associated with participants in an online marketplace that is accessed via a computer network and enables participants to buy and sell items to other participants in the online marketplace, the method comprising:

generating media objects for the participants to present seals for the participants based on information for the participants stored in a database;

communicating a requested one of the media objects to a web browser for presentment of the respective seal to a user as a portion of a website associated with the online marketplace;

after communicating the requested media object to the client device, receiving a request from the client device to view the information for the participant corresponding to the requested media object; and retrieving at least a portion of the information stored in the database for the participant associated with the requested media object as a function of a unique identifier provided by the request.

20. The method of claim 19, further comprising:

storing certification information for each of the participants within the database; and selectively providing the certification information stored within the database for the participant associated with media object to the user via the web browser.

21. The method of claim 20, wherein selectively providing the certification information comprises:

retrieving the certification information as a function of a unique identifier provided by the request; and communicating the certification information to the client device for display to the user.

22. The method of claim 20, wherein the participant comprises an online merchant and the information includes a transaction history for the merchant.

23. The method of claim 20, further comprising storing a disclosure setting for each of the participants, wherein selectively providing the information includes filtering the information based on the disclosure setting.

24. The method of claim 23, further comprising filtering the information based on a universal resource locator (URL) received during the request for the information.

25. The method of claim 20, wherein selectively presenting the certification information comprises providing a web page that includes the certification information.

26. The method of claim 19, further comprising:

verifying that the participants comply with compliance requirements;

storing verification data for the plurality of participants in a database of a seal issuer; and selectively presenting the seals for display within websites associated with the participants based on the verification data, wherein the seals represent compliance by the participants with the compliance requirements.

27. The method of claim 26, further comprising:

detecting non-compliance with the compliance requirements by one of the participants; and updating the verification data to revoke the respective seal for the non-compliant participant.

28. The method of claim 19, wherein the participant comprises an online merchant and the information includes a transaction history for the merchant.

29. The method of claim 19, further comprising storing a disclosure setting for each of the participants, wherein selectively providing the information includes filtering the information based on the disclosure setting.

30. The method of claim 29, further comprising filtering the information based on a universal resource locator (URL) received during the request for the information.

* * * * *